April 8, 1952  L. A. MAJNERI  2,592,442
POWER VALVE ASSEMBLY
Filed Nov. 27, 1944  4 Sheets-Sheet 1
FIG.1.
FIG.9.
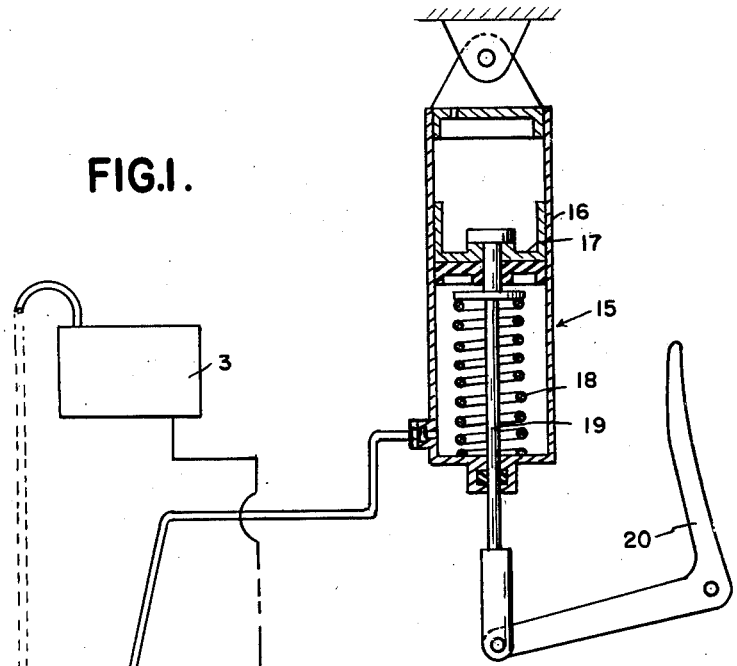
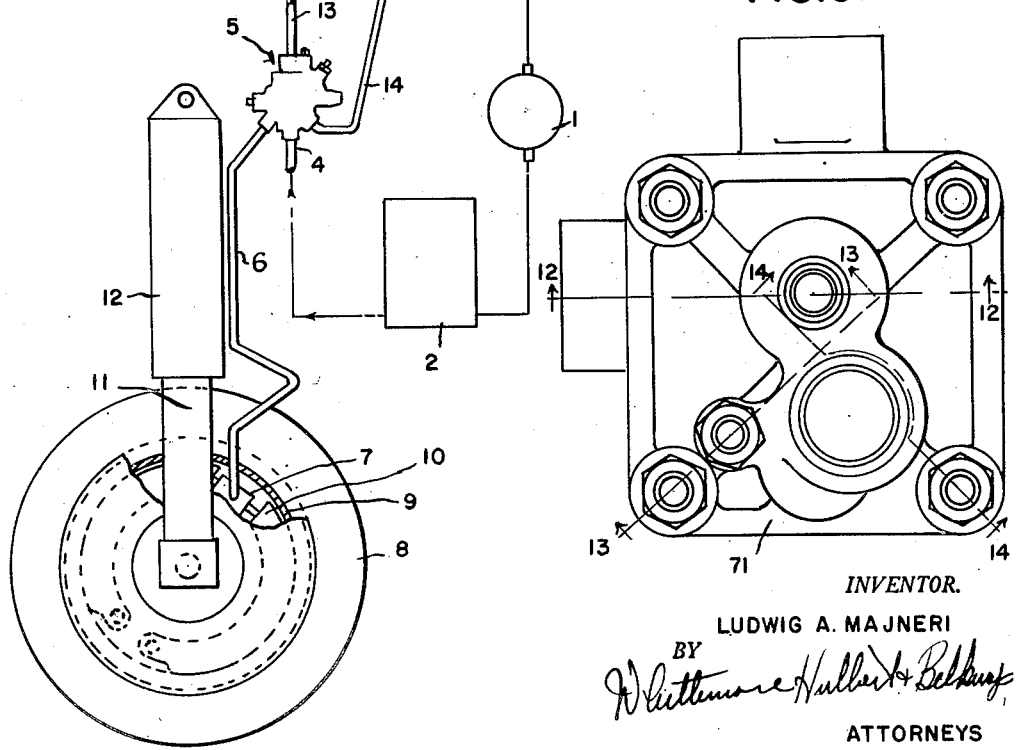
INVENTOR.
LUDWIG A. MAJNERI
BY
ATTORNEYS April 8, 1952 L. A. MAJNERI 2,592,442
POWER VALVE ASSEMBLY
Filed Nov. 27, 1944 4 Sheets-Sheet 2
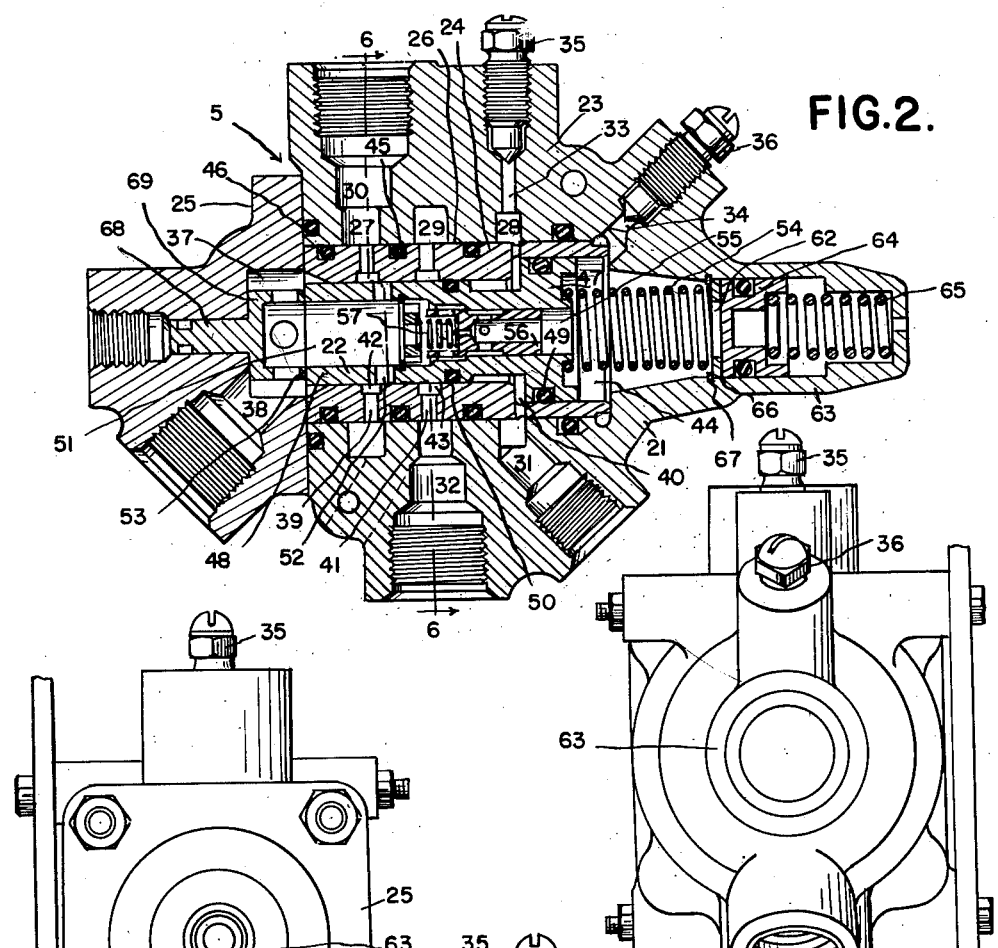
FIG.2.
FIG.3.
FIG.4.
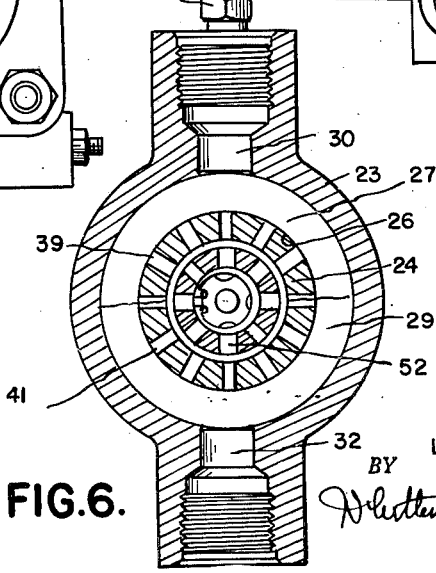
FIG.6.
INVENTOR.
LUDWIG A. MAJNERI
BY
ATTORNEYS April 8, 1952   L. A. MAJNERI   2,592,442
POWER VALVE ASSEMBLY
Filed Nov. 27, 1944   4 Sheets-Sheet 3
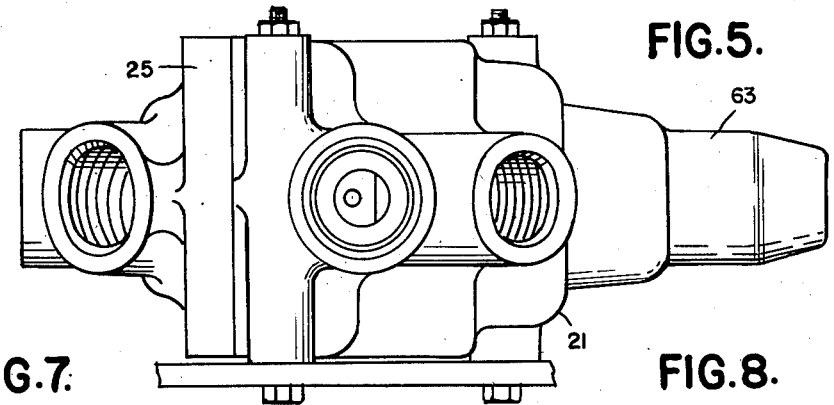
FIG.5.
FIG.7.   FIG.8.
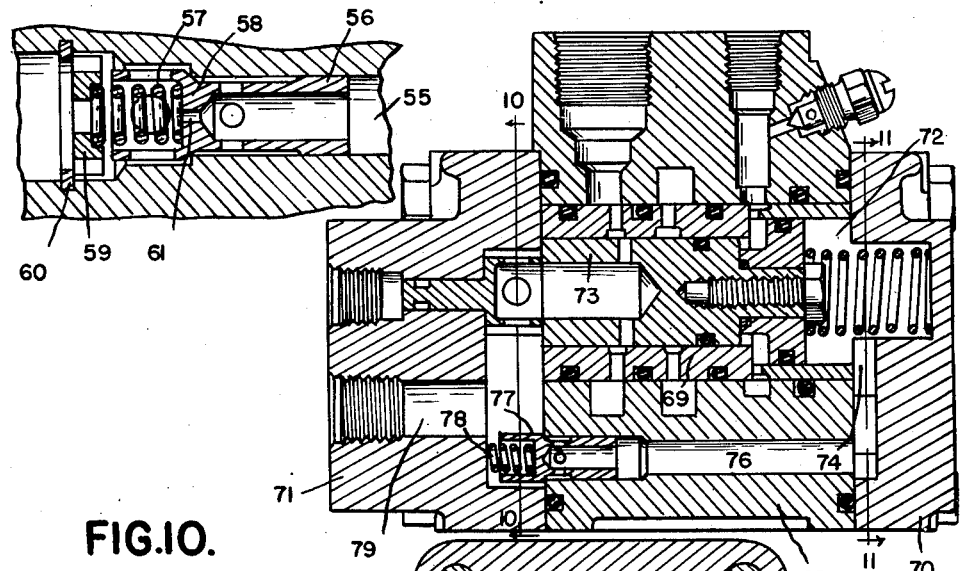
FIG.10.
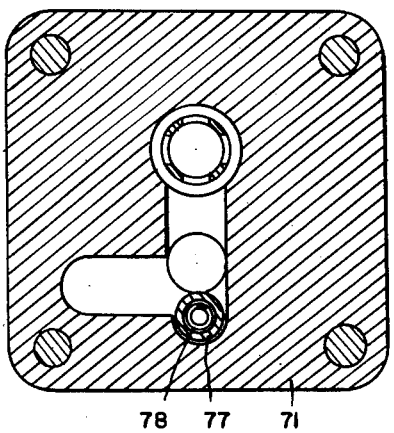
FIG.11.
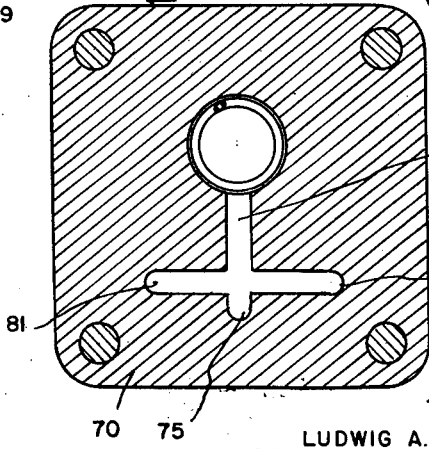
INVENTOR.
LUDWIG A. MAJNERI
BY
ATTORNEYS April 8, 1952  L. A. MAJNERI  2,592,442
POWER VALVE ASSEMBLY
Filed Nov. 27, 1944  4 Sheets-Sheet 4

INVENTOR.
LUDWIG A. MAJNERI
BY
Whittemore Hulbert & Belknap
ATTORNEYS

Patented Apr. 8, 1952

2,592,442

UNITED STATES PATENT OFFICE 2,592,442

POWER VALVE ASSEMBLY

Ludwig A. Majneri, Grosse Pointe, Mich., assignor to The Warner Aircraft Corporation, Detroit, Mich., a corporation of Michigan Application November 27, 1944, Serial No. 565,358

8 Claims. (Cl. 137—153)

1

The invention relates to power valve assemblies and refers more particularly to valve assemblies for controlling the flow of braking fluid from a source of braking fluid under high pressure to the fluid pressure operated actuator of a brake to apply the brake.

The invention has for one of its objects to provide an improved brake power valve assembly which has large capacity and is quick acting.

The invention has for another object to provide an improved brake power valve assembly in which the braking fluid admitted to the valve assembly from a source of braking fluid under high pressure assists in moving the valve unit to operative position to thereby assist in making the valve unit quick acting.

The invention has for still another object to provide an improved brake power valve assembly having means for relieving the pressure of the braking fluid in the portion of the chamber forward of the valve unit while the valve unit is being moved forwardly to thereby also assist in making the valve unit quick acting.

The invention has for a further object to provide an improved brake power valve assembly having means for controlling the pressure of the braking fluid admitted to the valve assembly from the source of braking fluid under high pressure by the pressure manually exerted upon the valve unit to move the same forwardly to operative position.

The invention has for a still further object to provide an improved brake power valve assembly having means for quickly supplying braking fluid to the portion of the chamber forward of the valve unit after the valve unit has been moved forwardly to thereby provide for quick action of the valve unit on its return to normal or inoperative position after the pressure exerted manually upon the valve unit has been relieved.

These and other objects of the invention will become apparent from the following description, taken in connection with the accompanying drawings, in which:

Figure 1 is a diagrammatic view, partly in section, of a portion of a brake system employing a power valve assembly embodying the invention;

Figure 2 is a longitudinal section through the power valve assembly;

Figures 3 and 4 are opposite end elevations of Figure 2;

Figure 5 is a bottom plan view of Figure 2;

2

Figure 12:
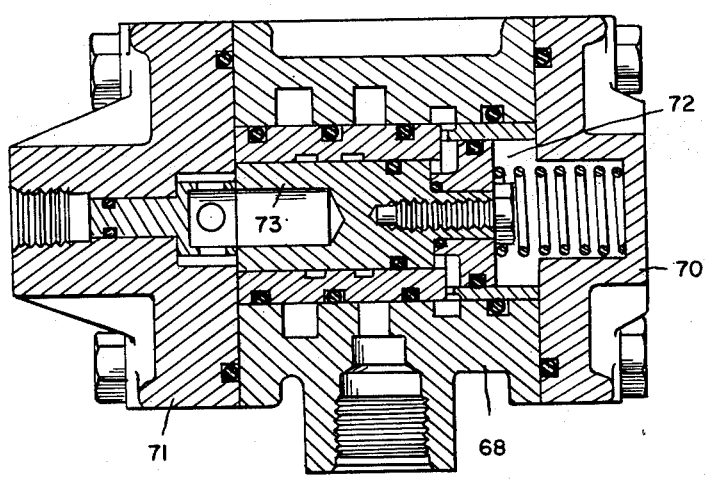
Figure 13:
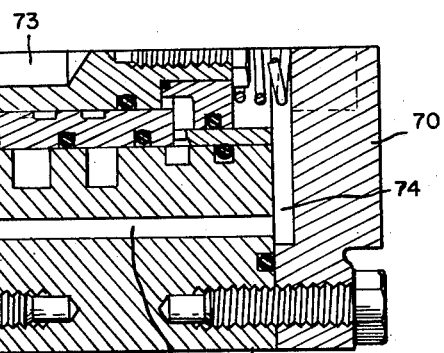
Figure 14:
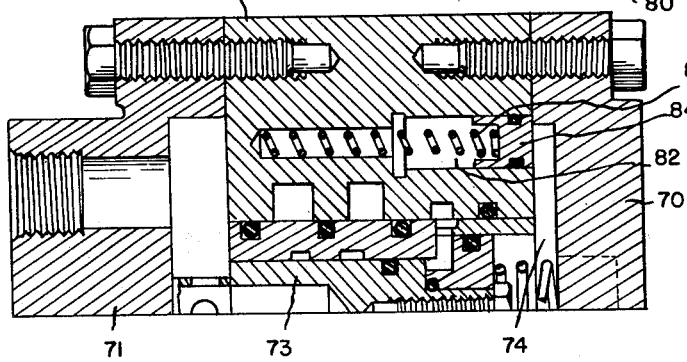

Figure 6 is a cross section on the line 6—6 of Figure 2;

Figure 7 is an enlarged section of a portion of Figure 2;

Figure 8 is a view similar to Figure 2 showing a modified construction of power valve assembly;

Figure 9 is an end view of Figure 8;

Figures 10 and 11 are cross sections on the lines 10—10 and 11—11 respectively, of Figure 8;

Figures 12, 13 and 14 are cross sections on the lines 12—12, 13—13, and 14—14, respectively, of Figure 9.

The power valve assembly is particularly adapted for use in an airplane wheel hydraulic brake system in which the fluid pressure operated actuator for the wheel brake is of large capacity, the displacement, for example, being approximately 15 cubic inches, or more. In the present instance, the braking fluid is a braking liquid under high pressure in the high pressure hydraulic system of an airplane which system, as shown in Figure 1, includes the usual pump 1, the usual accumulator 2 for receiving the braking liquid from the pump, and the usual reservoir 3 for supplying the pump with the braking liquid. The accumulator is of large capacity to maintain a large volume of the braking liquid under high pressure when the pump is idle. The accumulator is adapted to communicate through the tube 4, the power valve assembly 5 and the flexible tube 6 with the fluid pressure operated actuator or wheel cylinder 7 of the brake for the wheel 8 of the airplane. The brake may be of usual construction and, as diagrammatically shown, has the brake drum 9 and the brake shoes 10 engageable with the drum when the braking liquid enters the actuator. The wheel 8 is attached to the part 11 which is slidable within the part 12 attached to the airplane, the parts 11 and 12 forming a shock strut. The power valve assembly 5 is connected by the tube 13 to the reservoir 3 to provide for flow of the excess braking liquid to the reservoir when the valve of the power valve assembly has been returned to its normal or inoperative position.

The power valve assembly is preferably hydraulically operated by being connected through the tube 14 to the manually operable liquid pressure producing device or master cylinder 15. The device comprises the cylinder 16 attached at its upper end to the airplane, the piston 17 slidable within the cylinder and resiliently urged upwardly by the coil spring 18, the depending piston rod 19 and the foot pedal 20, which is pivotally mounted on the airplane. The device 15 preferably forms a part of the usual steering and braking stirrup mechanism of the airplane.

The power valve assembly 5, as illustrated particularly in Figures 2 to 7, inclusive, comprises the valve housing unit 21 and the valve unit 22 movable within a chamber in the valve housing unit. The valve housing unit comprises the body 23, the sleeve 24 and the cap 25. The body 23 has the central cylindrical chamber 26 which is closed at its front end. The body 23 has the annular outlet groove 27 encircling and opening into the chamber near its rear end, the annular inlet groove 28 encircling and opening into the chamber near its front end, and the annular inlet groove 29 encircling and opening into the chamber between the grooves 27 and 28. The annular groove 27 opens into the port 30 in the body 23 and this port is connected by the tube 13 to the liquid reservoir 3. The annular groove 28 opens into the port 31 in the body 23 and this port is connected by the tube 14 to the liquid pressure producing device 15. The annular groove 29 opens into the port 32 in the body 23 and this port is connected by the tube 4 to the accumulator 2. The body 23 is also provided with the ports 33 and 34, respectively, opening into the uppermost portion of the annular groove 28 and the uppermost portion of the chamber 26 at its front end. These ports may be closed by the bleeder valves 35 and 36, respectively, the construction providing for the filling and bleeding of the power valve assembly. The rear end of the chamber 26 is closed by the cap 25 which has the central recess 37 in substantially axial alignment with and of smaller diameter than the chamber. The cap is also formed with the port 38 opening into the recess and connected by the tube 6 to the fluid pressure operated actuator 7.

The sleeve 24 is cylindrical and fits within the cylindrical chamber 26 and has the radial ports 39, 40 and 41 opening into the annular grooves 27, 28 and 29, respectively. The sleeve also has the internal annular grooves 42 and 43 into which the radial ports 39 and 41, respectively, open. The front end portion of the wall of the sleeve through which the radial ports 40 extend is of less thickness than the rear end portion in which the radial ports 39 and 41 are located so that as a result the sleeve forms the chamber 44 having front and rear end portions of different diameters with the front end portion of larger diameter.

To seal the joint between the sleeve 24 and the body 23, I have provided the O rings 45 of circular cross section and preferably formed of either natural or synthetic rubber. These O rings are located in annular grooves formed in either the body or the sleeve and contact with either the sleeve or the body. Furthermore, they are located at opposite sides of each of the radial ports 39, 40 and 41. In addition, the joint between the body 23 and the cap 25 is sealed by a like O ring 46 which is located in an annular groove in the rear end of the body and contacts with the forward end of the cap.

The valve unit 22 is slidable within the sleeve 24 and has the front and rear end portions 47 and 48, respectively, of different diameters for a sliding fit with the end portions of the sleeve. The larger portion 47 is formed with an annular groove within which is located the O ring 49 engaging the adjacent portion of the sleeve, while the smaller portion 48 is formed with an annular groove within which is located the O ring 50 for engaging the adjacent portion of the sleeve. The smaller portion 48 has the chamber 51 communicating with the recess 37 and also has the radial ports 52 for alternatively communicating with the annular grooves 42 and 43. The ports 52 communicate with the annular groove 42 in the normal or inoperative position of the valve unit which is determined by the stop 53 engaging the rear end of the valve unit. The ports 52 communicate with the annular groove 43 in the operative position of the valve unit after it has been moved forwardly. The limit of the forward movement is determined by the wall of the body 23 at the front end of the chamber 26, the wall being engageable with the front end of the valve unit. To normally hold the valve unit in its inoperative position, there is the coil spring 54 having its rear end abutting the front end of the valve unit.

With the construction as thus far described, when liquid under pressure is forced from the liquid pressure producing device 15 through the tube 14 and inlet port 31 into the enlarged portion of the chamber 44, the liquid acts upon the larger portion 47 of the valve unit 22 and longitudinally moves the valve unit forwardly. During the forward movement of the valve unit, the ports 52 are moved out of communication with the annular groove 42 and into communication with the annular groove 43, at which latter time braking liquid under high pressure is admitted from the port 32 into the chamber 51 of the valve unit and the recess 37 and port 38 of the cap and creates a pressure in the fluid pressure operated actuator 7. Also the braking liquid admitted into the valve unit exerts pressure upon the rear end of the valve unit and the front end of the chamber 51 of the valve unit to move the same forwardly. It will thus be seen that the force of the braking liquid admitted into the valve unit is added to the force of the liquid from the manually operable liquid pressure producing device to move the valve unit forwardly with the result that the brake power valve assembly is quick acting so that there is no appreciable lag in operation of the brake.

To assist in making the valve unit quick acting, the pressure in the chamber 44 forward of the valve unit is relieved during the forward movement of the valve unit and this is accomplished by forming the valve unit with the axial passage 55 and controlling this passage by the spring-pressed check valve 56. The passage opens into the chamber 51 and the chamber 44 forward of the valve unit. The check valve 56 is movable rearwardly against the resistance offered by the coil spring 57 to provide for relatively free movement of liquid from the portion of the chamber 44 forward of the valve unit to the chamber 51 in the valve unit. The check valve, as shown, is tubular and has the transverse wall 58 intermediate its ends which is engaged by one end of the coil spring 57. The other end of the coil spring engages the spider 59 which is secured in the chamber 51 of the valve unit by the snap ring 60.

To control the pressure of the braking liquid admitted to and building up in the chamber 51 of the valve unit by the pressure of the liquid entering the port 31 and acting upon the valve unit to move the same forwardly to operative position, the transverse wall 58 of the check valve is formed with the restricted opening 61. The size of the opening depends upon the capacity of the fluid pressure operated actuator 7 and the friction loss in the tube 6. By reason of the opening 61 the pressure of the braking liquid in the chamber 51 of the valve unit is transmitted to the chamber 44 forward of the valve unit to act in opposition to the pressure of the liquid upon the enlarged portion of the valve unit moving the latter forwardly. If the net pressure forward of the valve unit, plus the pressure of the spring 54, slightly exceeds the manually created pressure of the liquid acting to move the valve unit forwardly, the valve unit is moved rearwardly to close the communication between the ports 52 and the annular groove 43. If the net pressure forward of the valve unit, plus the pressure of the spring 54, becomes appreciably greater than the manually created pressure of the liquid acting to move the valve unit forwardly, the valve unit is moved rearwardly to a position placing the ports 52 in communication with the annular groove 42 and the outlet port 30 to the reservoir 3 to permit the escape of some of the braking liquid in the chamber 51 to thereby lower the pressure of the braking liquid in the chamber until the net pressure of the braking liquid in the chamber 44 forwardly of the valve unit, plus the pressure exerted by the spring 54, becomes slightly less than the manually created pressure for moving the valve unit forwardly. The size of the restricted opening is such that the valve unit preferably moves forwardly and rearwardly at a relatively slow rate.

To provide for quick action of the valve unit on its return to normal or inoperative position after the pressure exerted manually upon the valve unit to move the same forwardly has been relieved, there is preferably provided the expansible liquid receiving chamber 62 forward of and in communication with the chamber 44. This chamber is formed by the cylindrical portion 63 of the front wall of the body 23 and the piston 64 slidable in the cylindrical portion and urged by the coil spring 65 rearwardly. 66 is a washer for abutting the rear end of the piston 64 and held in place by the snap ring 67. The strength of the spring 65 is such that when the valve unit 22 is moved forwardly and braking liquid is admitted into the chamber 51 of the valve unit the piston 64 is moved forwardly by the braking liquid. However, when the pressure exerted manually upon the valve unit to move the same forwardly has been relieved, the braking liquid stored in the cylindrical portion 63 and rearward of the piston 64 is forced into the front end of the chamber 44 by the coil spring 65 to fill the portion of the chamber 44 forward of the valve unit while the valve unit is moving to its normal or inoperative positions. It will thus be seen that this movement of the valve unit may occur at a rapid rate so that the valve unit is quick acting during its rearward movement.

As illustrated in the present instance, the valve unit may also be advanced or moved forwardly, if desired, by the plunger 68 slidable in the cap 25 and having the cup-shaped portion 69 located within the recess 37. The cup-shaped portion forms the stop 53 and is provided with transverse holes to place the port 38 in communication with the chamber 51 in the valve unit. With this construction, the pressure of the braking liquid in the chamber 51 is also controlled by the pressure exerted upon the plunger 68 for moving it forwardly.

With the construction as now described, it will be noted that the valve unit 22 is normally maintained in inoperative position with its ports 52 in communication with the annular groove 42 and radial ports 39 so that excess braking liquid is free to flow to the reservoir 3. Upon forward movement of the valve unit, either by actuation of the manually operable liquid pressure producing device 15 or the plunger 68, communication between the ports 52 and the annular groove 42 is broken, after which the ports 52 are placed in communication with the annular groove 43 and the inlet port 32, at which time braking liquid under high pressure is admitted into the chamber 51 in the valve unit. Prior to placing the ports 52 in communication with the annular groove 43, the check valve 56 opens to relieve the pressure of the braking liquid in the chamber 44 forward of the valve unit. The pressure of braking liquid in the chamber 51 is transmitted to the fluid pressure operated actuator 7 and also to the rear end of the valve unit 22 and the front end of the chamber 51, the check valve 56 being closed after the ports 52 are initially placed in communication with the annular groove 43. As a result, the braking liquid under high pressure assists in rapidly moving the valve unit forwardly so that it is quick acting and advantage may be taken of substantially the full capacity of the ports 52 for the entrance of braking liquid under high pressure into the chamber 51. The restricted opening 61 now functions to transmit the pressure of the braking liquid building up in the chamber 51 of the valve unit to the chamber 44 forward of the valve unit and when this transmitted pressure, plus that of the coil spring 54, slightly exceeds the pressure acting to move the valve unit forwardly communication is broken between the ports 52 and the annular groove. Finally, when the pressure exerted upon the valve unit to move it forwardly is relieved, the braking liquid which has been stored in the expansible chamber 62 is forced therefrom into the chamber 44 to assist in the rapid rearward movement of the valve unit to its normal or inoperative position.

The brake power valve assembly illustrated in Figures 8 to 14, inclusive, differs essentially from that illustrated in Figures 2 to 7, inclusive, in forming the valve housing unit with the pressure relieving means, the pressure transmitting or equalizing means, and the expansible chamber. Also the brake power valve assembly differs in closing the front end of the valve housing unit chamber by a cap which is formed separately from the body. More in detail, the valve housing unit is formed by the body 68, the sleeve 69 and the caps 70 and 71 at the opposite ends of the body. The valve housing unit has the chamber 72 for receiving the valve unit 73. The arrangement of annular grooves and ports and the construction of sleeve is essentially the same as illustrated in Figures 2 to 7, inclusive. The pressure of the braking liquid in the front end of the chamber 72 forward of the valve unit 73 is relieved while the valve unit is being moved forwardly by forming the cap 70 and body 68 with communicating passages and by controlling the flow of liquid through these passages by a check valve. More particularly, the cap 70 has the vertical passages 74 and 75 and the body 68 has the longitudinal passage 76 in which is located the check valve 77, which latter is movable rearwardly against the effort exerted by the coil spring 78 to place the passage 76 in relatively free communication with the outlet 79 connected to the fluid pressure operated actuator. The valve housing unit 68 is also provided with the longitudinal passage 80 in communication with the transverse passage 81 in the cap 70 and also in restricted communication with the outlet 79 in the cap 71. In the present instance, the restricted communication is secured by means of the valve 81' which is adjustably threaded in the cap 71 and enters the adjacent end of the passage 80. The expansible chamber, which is preferably provided, is formed in the body 68 by providing the body with the cylindrical recess 82 opening into the transverse passage 83 in the cap 70 and positioning within this recess the piston 84 which is resiliently urged forwardly by the coil spring 85.

The operation of the brake power valve assembly of Figures 8 to 14, inclusive, is substantially the same as that of Figures 2 to 7, inclusive.

What I claim as my invention is:

1. A brake power valve assembly comprising a valve housing having a chamber, an inlet port for connection with a source of fluid under high pressure, first and second outlet ports spaced from each other at one side of said inlet port, said inlet and outlet ports opening into said chamber, and a valve movable within said chamber between inoperative and operative positions and having a chamber communicating with the first outlet port and a port opening into said valve chamber for alternatively communicating with the second outlet port and said inlet port when said valve is in inoperative position and operative position respectively, said valve having a surface subject to fluid under high pressure entering through said inlet port to assist in moving said valve to operative position.

2. A brake power valve assembly comprising a valve housing having a chamber, an inlet port for connection with a source of fluid under high pressure, a pair of longitudinally spaced delivery and reservoir outlet ports at the same side of said inlet port, said inlet and outlet ports opening into said chamber, a valve movable longitudinally within said chamber between inoperative and operative positions and having a chamber communicating with said delivery outlet port and a port opening into said valve chamber for alternatively communicating with said reservoir outlet port and said inlet port when said valve is in inoperative position and operative position respectively, said valve having a surface subject to fluid under high pressure entering through said inlet port to assist in moving said valve to operative position, and means for normally holding said valve in position with said valve port communicating with said reservoir outlet port.

3. A brake power valve assembly comprising a valve housing unit having a chamber, an inlet port for connection with a source of liquid under high pressure, a pair of longitudinally spaced delivery and reservoir outlet ports at the same side of said inlet port, said inlet and outlet ports opening into said chamber, and a valve unit within said chamber and having a chamber communicating with said delivery outlet port and a port opening into said valve chamber for alternatively communicating with said reservoir outlet port and said inlet port, said valve unit normally occupying an inoperative position with said valve port communicating with said reservoir outlet port and being longitudinally movable forwardly to an operative position with said valve port communicating with said inlet port, one of said units having means providing for relatively free communication between the portion of said first mentioned chamber forward of said valve unit and said delivery outlet port upon forward movement of said valve unit and also for restricted communication therebetween.

4. A brake power valve assembly comprising a valve housing unit having a chamber, an inlet port for connection with a source of liquid under high pressure, a pair of longitudinally spaced delivery and reservoir outlet ports at the same side of said inlet port, said inlet and outlet ports opening into said chamber, and a valve unit within said chamber and having a chamber communicating with said delivery outlet port and a port opening into said valve chamber for alternatively communicating with said reservoir outlet port and said inlet port, said valve unit normally occupying an inoperative position with said valve port communicating with said reservoir outlet port and being longitudinally movable forwardly to an operative position with said valve port communicating with said inlet port, one of said units having means providing for relatively free communication between the portion of said first mentioned chamber forward of said valve unit and said delivery outlet port upon forward movement of said valve unit and also for restricted communication therebetween, one of said units having an expansible liquid receiving chamber communicating at all times with the portion of said first mentioned chamber forward of said valve unit.

5. A brake power valve assembly comprising a valve housing unit having a chamber, an inlet port for connection with a source of liquid under pressure, a pair of longitudinally spaced delivery and reservoir outlet ports at the same side of said inlet port, said inlet and outlet ports opening into said chamber and a valve unit within said chamber and having a chamber communicating with said delivery outlet port, and a port opening into said valve chamber for alternatively communicating with said reservoir outlet port and said inlet port, said valve unit normally occupying an inoperative position with said valve port communicating with said reservoir outlet port and being longitudinally movable forwardly to an operative position with said valve port communicating with said inlet port, said valve unit having a surface subject to fluid under pressure entering through said inlet port to assist in moving said valve unit to operative position, one of said units having means for relieving the pressure in the portion of said first mentioned chamber forward of said valve unit upon forward movement of said valve unit and also for slowly equalizing the pressure in said delivery outlet port and the portion of said first mentioned chamber forward of said valve unit.

6. A brake power valve assembly comprising a valve housing having a chamber, an inlet port opening into said chamber for connection with a source of liquid under high pressure, a pair of longitudinally spaced delivery and reservoir outlet ports opening into said chamber at the same side of said inlet port, a valve longitudinally movable within said chamber and having a chamber communicating with said delivery outlet port and a port opening into said valve chamber for alternatively communicating with said reservoir outlet port and said inlet port, said valve further having a passage for placing the portion of said first mentioned chamber forward of said valve in communication with said valve chamber, and a check valve controlling said passage and providing for relatively free movement of the liquid from the portion of said first mentioned chamber forward of said valve to said valve chamber upon advance of said valve and also providing for restricted flow of the liquid from said valve chamber to the portion of said first mentioned chamber forward of said valve.

7. A brake power valve assembly comprising a valve housing having a chamber, an inlet port opening into said chamber for connection with a source of liquid under high pressure, a pair of longitudinally spaced delivery and reservoir outlet ports opening into said chamber at the same side of said inlet port, a valve longitudinally movable within said first mentioned chamber and having a chamber communicating with said delivery outlet port and a port opening into said valve chamber for alternatively communicating with said reservoir outlet port and said inlet port, means for normally holding said valve in position with said valve port communicating with said reservoir outlet port, said valve housing having passages leading from said delivery outlet port to the forward portion of said first mentioned chamber, a spring-pressed check valve for one of said passages movable to provide for relatively free flow of liquid from the forward portion of said first mentioned chamber to said delivery outlet port, and means cooperating with the other of said passages for restricting the flow of liquid therethrough.

8. A brake power valve assembly comprising a valve housing unit having a chamber, an inlet port for connection with a source of fluid under high pressure, a pair of separated delivery and reservoir outlet ports, said inlet and outlet ports opening into said chamber, and a valve unit movable within said chamber between operative and inoperative positions and provided with means for alternatively placing said delivery outlet port in communication with said reservoir outlet port and said inlet port for connection with a source of fluid under high pressure, said valve unit having a surface subject to fluid under high pressure to assist in moving said valve unit to operative position and one of said units having means providing for relatively free communication between the portion of said first mentioned chamber forward of said valve unit and said delivery outlet port upon forward movement of said valve unit, one of said units having means providing for restricted communication between the portion of said first mentioned chamber forward of said valve unit and said delivery outlet port.

LUDWIG A. MAJNERI.

REFERENCES CITED

The following references are of record in the file of this patent:

UNITED STATES PATENTS

| Number | Name | Date |
|---|---|---|
| 1,645,798 | Callan | Oct. 18, 1927 |
| 1,962,857 | Cash | June 12, 1934 |
| 2,244,317 | Rockwell | June 3, 1941 |
| 2,306,346 | Rockwell | Dec. 22, 1942 |
| 2,407,957 | Hull-Ryde | Sept. 17, 1946 |
| 2,459,664 | Majneri | Jan. 18, 1949 |
| 2,468,960 | Case | May 3, 1949 |

FOREIGN PATENTS

| Number | Country | Date |
|---|---|---|
| 598,690 | Germany | June 15, 1934 |